United States Patent
Nakamura et al.

(10) Patent No.: US 7,038,557 B2
(45) Date of Patent: May 2, 2006

(54) ANTENNA DUPLEXER AND MOBILE COMMUNICATION DEVICE USING THE SAME

(75) Inventors: Hiroyuki Nakamura, Katano (JP); Toshio Ishizaki, Kobe (JP); Hisashi Adachi, Minoo (JP); Makoto Sakakura, Uji (JP); Hiroaki Kosugi, Hirakata (JP); Hiroyuki Itokawa, Yokohama (JP); Toshiaki Nakamura, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 877 days.

(21) Appl. No.: 10/085,264

(22) Filed: Feb. 27, 2002

(65) Prior Publication Data

US 2002/0186757 A1    Dec. 12, 2002

(30) Foreign Application Priority Data

Feb. 27, 2001    (JP) ............................. 2001-051791

(51) Int. Cl.
*H03H 7/46* (2006.01)
(52) U.S. Cl. ..................... 333/132; 333/133; 333/193
(58) Field of Classification Search ........ 333/132–133, 333/193–196; 455/80, 83
See application file for complete search history.

(56) References Cited

U.S. PATENT DOCUMENTS

| | | | |
|---|---|---|---|
| 5,205,652 A * | 4/1993 | Chapman ..................... 384/119 |
| 5,634,200 A * | 5/1997 | Kitakubo et al. ............. 455/82 |
| 6,097,268 A | 8/2000 | Watanabe et al. | |
| 6,307,448 B1 | 10/2001 | Atokawa et al. | |
| 6,351,195 B1 * | 2/2002 | Atokawa et al. ............ 333/134 |
| 6,414,566 B1 | 7/2002 | Atokawa et al. | |
| 6,525,624 B1 * | 2/2003 | Hikita et al. ................. 333/133 |
| 6,809,611 B1 * | 10/2004 | Ishizaki et al. ............. 333/133 |
| 6,861,924 B1 * | 3/2005 | Machui ...................... 333/133 |

FOREIGN PATENT DOCUMENTS

EP    0 481 825 A    4/1992

(Continued)

OTHER PUBLICATIONS

European Search Report corresponding to application No. EP 04-02-6828 dated Aug. 2, 2005.

(Continued)

*Primary Examiner*—Robert Pascal
*Assistant Examiner*—Kimberly Glenn
(74) *Attorney, Agent, or Firm*—RatnerPrestia

(57) ABSTRACT

An antenna duplexer has an antenna terminal;
a transmitting phase-shift circuit, one side of which is connected to the antenna terminal;
a receiving phase-shift circuit, one side of which is connected to the antenna terminal;
a transmitting filter connected to the other side of the transmitting phase-shift circuit and a transmitting terminal; and
a receiving filter connected to the other side of the receiving phase-shift circuit and a receiving terminal;
wherein the transmitting filter and/or the receiving filter is a composite filter, and the composite filter attains a characteristic having an attenuation pole at simultaneous transmission and reception time when transmission and reception are simultaneously performed, and controls respective impedances by the transmitting phase-shift circuit and the receiving phase-shift circuit to operate as a sharing unit and attains a characteristic where the attenuation pole is removed at non simultaneous transmission and reception time when transmission and reception are not performed simultaneously.

30 Claims, 12 Drawing Sheets

FOREIGN PATENT DOCUMENTS

| | | |
|---|---|---|
| EP | 0 751 631 A | 1/1997 |
| EP | 0 865 095 A | 9/1998 |
| EP | 0 964 477 A | 12/1999 |
| EP | 0 993 063 A | 4/2000 |
| EP | 1 014 592 A | 6/2000 |
| EP | 1 035 648 A | 9/2000 |
| EP | 1 061 662 A | 12/2000 |
| JP | 2511885 | 1/1988 |
| JP | 3104324 | 5/1991 |
| JP | 2000-059104 A | 2/2000 |
| JP | 2000-349580 | 12/2000 |

OTHER PUBLICATIONS

European Search Report for EP 02 00 4443, dated Oct. 23, 2003.

* cited by examiner

ANTENNA DUPLEXER AND MOBILE COMMUNICATION DEVICE USING THE SAME

BACKGROUND OF THE INVENTION

1. Field of the Invention

The present invention relates to an antenna duplexer which, for example, can handle individually a transmitted signal and a received signal of a portable telephone or the like, and to a mobile communication device.

2. Related Art of the Invention

In recent years, in mobile communication devices, a frequency-division system capable of simultaneously transmission and reception has been used in systems such as CDMA and the like, and it has attracted attention from the standpoint of expansion of the transmission information content of data communications and the like. In order to make such a simultaneous transmission and reception possible, a shared antenna unit that handles individually the transmitted signal and the received signal, has been widely used. Furthermore, regarding the mobile communication devices such as portable telephones and the like, in order to realize miniaturization and high performance, miniaturization of the sharing unit and a low-loss have been given much attention.

Regarding the systems, which are not of simultaneous transmission and reception such as GSM and the like, antenna switches have been widely used. With respect to these switches, however, though miniaturization and low-loss have been realized due to a constitution having a semiconductor IC and a pin diode, they are not adaptable to simultaneous transmission and reception.

Hereinafter, one example of a conventional sharing unit will be described with reference to the drawings. Note that FIG. 10 shows an equivalent circuit of a conventional sharing unit and the like.

In FIG. 10, the sharing unit 1001 is constituted by a transmitting filter 1002 which is a low-pass filter (LPF) arranged at the transmitting side, a receiving filter 1003 which is a band-pass filter (BPF) arranged at the receiving side, an antenna terminal (ANT) 1004, a transmitting terminal (Tx) 1005 and a receiving terminal (Rx) 1006. The transmitting filter 1002, the receiving filter 1003 and the antenna terminal 1004 are connected via a common terminal 1007. The transmitted signal inputted from the transmitting terminal 1005 is transmitted to the antenna terminal 1004 via the transmitting filter 1002.

At this time, since the impedance of the transmitted frequency band from the common terminal 1007 toward the band-pass filter 1003 of the receiving side, is ideally adjusted to be in an open state, the transmitted signal is not transmitted to the receiving terminal 1006. The received signal inputted from the antenna terminal 1004 is transmitted to the receiving terminal 1006 via the band-pass filter 1003 of the receiving side. At this time, since the impedance of the reception frequency band from the common terminal 1007 toward the low-pass filter 1002 of the transmitting side, is ideally adjusted to be in an open state, the received signal is not transmitted to the transmitting terminal 1005.

However, when the above described constitution is used in the case where a system using the frequency division system which is a simultaneous transmission and reception coexists with a system which is a non-simultaneous transmission and reception, there arose a problem that a loss becomes larger than when the antenna switch was used.

SUMMARY OF THE INVENTION

In view of the above described problem, the present invention aims to provide an antenna duplexer and a mobile communication device, which can be used even in the system where the simultaneous transmission and reception coexists with the non-simultaneous transmission and reception.

One aspect of the present invention is an antenna duplexer comprising:

an antenna terminal;

a transmitting phase-shift circuit, one side of which is connected to said antenna terminal;

a receiving phase-shift circuit, one side of which is connected to said antenna terminal;

a transmitting filter connected to the other side of said transmitting phase-shift circuit and a transmitting terminal; and a receiving filter connected to the other side of said receiving phase-shift circuit and a receiving terminal;

wherein said transmitting filter and/or said receiving filter is a composite filter, and said composite filter attains a characteristic having an attenuation pole at simultaneous transmission and reception time when transmission and reception are simultaneously performed, and controls respective impedances by said transmitting phase-shift circuit and said receiving phase-shift circuit to operate as a sharing unit and attains a characteristic where said attenuation pole is removed at non simultaneous transmission and reception time when transmission and reception are not performed simultaneously.

Another aspect of the present invention is an antenna duplexer comprising:

an antenna terminal;

an antenna switch connected to said antenna terminal;

a transmitting phase-shift circuit connected to the one side terminal of said antenna switch;

a receiving phase-shift circuit connected to the other side terminal of said antenna switch;

a transmitting filter connected to the other side of said transmitting phase-shift circuit and a transmitting terminal; and a receiving filter connected to the other side of said receiving phase-shift circuit and a receiving terminal;

wherein, at a non-simultaneous transmission and reception time when transmission and reception are not performed simultaneously, said antenna switch performs an operation of switching over to time division of the operation to electrically connect said antenna terminal to said one side terminal and the operation to electrically connect said antenna terminal to said other side terminal, respectively, and wherein, at a simultaneous transmission and reception time when transmission and reception are performed simultaneously, said antenna switch performs the operation to connect said antenna terminal to said one side terminal and said other side terminal simultaneously.

Still another aspect of the present invention is the antenna duplexer, wherein said transmitting filter is a composite filter, and wherein said composite filter attains a characteristic having the attenuation pole at said simultaneous transmission and reception time, and controls respective impedances by said transmitting phase-shift circuit and said receiving phase-shift circuit so as to operate as a sharing unit and attains a characteristic where said attenuation pole is removed at non simultaneous transmission and reception time.

Yet still another aspect of the present invention is the antenna duplexer comprising a constitution employing a laminated filter which uses a dielectric green sheet, that said transmitting filter and at least the one side of said receiving filter are formed in said laminated filter, and said switch being mounted on the upper surface of said laminated filter.

Still yet another aspect of the present invention is the antenna duplexer, wherein said receiving filter is an surface acoustic wave filter.

A further aspect of the present invention is the antenna duplexer, wherein said receiving filter is the composite filter.

A still further aspect of the present invention is the antenna duplexer, wherein, at said simultaneous transmission and reception time, an output level of a transmitting amplifier directly or indirectly connected to said transmitting terminal is raised relative to said non-simultaneous transmission and reception.

A yet further aspect of the present invention is the antenna duplexer, wherein adjustment to raise the output level of said transmitting amplifier is performed by increasing a power source voltage of said transmitting amplifier.

A still yet further aspect of the present invention is the antenna duplexer, wherein said composite filter has an input terminal, an output terminal, at least one transmitting circuit and at least not less than one switching notch filter, said transmitting circuit is electrically connected between said input terminal and said output terminal, said switching notch filter is connected to at least either one of the input side and output side of said transmitting circuit, said switching notch filter has at least one switch and at least one series resonance circuit, one end of said switch is connected between said input terminal and said output terminal, the other end of said switch is connected to one end of said series resonance circuit, and said switch has a control terminal to switch ON/OFF.

An additional aspect of the present invention is the antenna duplexer, wherein, when said switch is in an ON state, a passing characteristic from said input terminal to said output terminal is a characteristic superposed with the characteristic having the attenuation pole formed by the characteristic of said transmitting circuit and said series resonance circuit of said switching notch filter, and wherein, when said switch is in an OFF state, a passing characteristic from said input terminal to said output terminal substantially becomes a characteristic which is possessed by the transmitting circuit.

A still additional aspect of the present invention is the antenna duplexer, wherein said transmitting circuit is constituted by a circuit having a filter function.

A yet additional aspect of the present invention is the antenna duplexer, wherein said transmitting circuit is constituted by a serial connection of capacitors.

A yet additional aspect of the present invention is the antenna duplexer, wherein said transmitting circuit is constituted by a strip line.

A supplementary aspect of the present invention is the antenna duplexer, wherein said antenna duplexer has a constitution employing a laminated filter which uses a dielectric green sheet, said switching notch filter is formed in said laminated filter, and said switch is mounted on the upper surface of said laminated filter.

A still supplementary aspect of the present invention is the antenna duplexer, wherein said antenna switch is integrated with another switch connected to said antenna terminal.

A yet supplementary aspect of the present invention is the antenna duplexer, wherein, at said simultaneous transmission and reception time, by the same control signal, said antenna switch performs an operation to electrically connect said antenna terminal, said one side terminal and said other side terminal of said antenna terminal and an operation to turn ON a switch of the switching notch filter of said composite filter.

A still yet supplementary aspect of the present invention is the antenna, wherein, at said non-simultaneous transmission and reception time, by the same control signal, said antenna switch performs by time division an operation to handle individually the electrical connection with said one side terminal or said other side terminal from said antenna terminal and an operation to turn OFF a switch of said switching notch filter of said composite filter.

One aspect of the present invention is the antenna duplexer, wherein, when said switch is turned ON, said series resonance circuit attains a characteristic having the attenuation pole and, when said switch is turned OFF, said series resonance circuit is electrically separated in a channel from said input terminal to said output terminal, and the passing characteristic from said input terminal to said output terminal attains a substantially same characteristic as the transmitting circuit.

Another aspect of the present invention is the antenna duplexer, wherein a FET is used for said switch.

Still another aspect of the present invention is the antenna duplexer, wherein a pin diode is used for said switch.

Yet still another aspect of the present invention is the antenna duplexer, wherein a pin diode and a quarter wave length line are used for said switch.

Still yet another aspect of the present invention is the antenna duplexer, wherein said series resonance circuit has a constitution in which a capacitor and a resonator are connected in series.

A further aspect of the present invention is the antenna duplexer, wherein said series resonance circuit has a constitution in which an inductor and the resonator are connected in series.

A still further aspect of the present invention is the antenna duplexer, wherein said series resonance circuit has a constitution in which a circuit consisting of a capacitor and inductor connected in parallel and the resonator connected are connected in series.

A yet further aspect of the present invention is the antenna duplexer, wherein said composite filter has an input terminal, an output terminal, at least one transmitting circuit and at least not less than one switching notch filter, said transmitting circuit is electrically connected between said input terminal and said output terminal, said switching notch filter is connected to at least either one of the input side and output side of said transmitting circuit, said switching notch filter has at least one switch and at least one surface acoustic wave filter, one end of said switch is connected between said input terminal and said output terminal, the other end of said switch is connected to one end of said surface acoustic wave filter, and said switch has a control terminal to switch ON/OFF.

A still yet further aspect of the present invention is the antenna duplexer, wherein said composite filter has an input terminal, an output terminal, and more than at least one switching notch filter connected to said input terminal and said output terminal, said switching nortch filter has two swtiches connected said input terminal and said output terminal, respectively, the notch filter and the transmitting circuit have a predetermined characteristic are connected in parallel between said two switches, and said notch filter and said transmitting circuit have a predetermined characteristic being able to be switched by said switch.

An additional aspect of the present invention is the antenna duplexer, wherein said notch filter consists of a parallel resonant circuit.

A still additional aspect of the present invention is the antenna duplexer, wherein said notch filter is an surface acoustic wave filter.

A yet additional aspect of the present invention is a mobile communication device corresponding to simultaneous transmission and reception which simultaneously performs transmission and reception and non simultaneous transmission and reception which does not simultaneously perform transmission and reception comprising:

an antenna connection circuit; and wherein the antenna duplexer according to 1st invention is used for said antenna connection circuit.

A still yet additional aspect of the present invention is the mobile communication device corresponding to simultaneous transmission and reception which simultaneously performs transmission and reception and non-simultaneous transmission and reception which does not simultaneously perform transmission and reception, wherein, at said non-simultaneous transmission and reception time, the antenna connection circuit is provided which operates as a transmit-receive selector switch having filters at a transmitting side and a receiving side and, at the simultaneous transmission and reception time, operates as the sharing unit, and wherein the antenna duplexer is used for said antenna connection circuit.

| Description of Symbols | |
|---|---|
| 101 | LOW-PASS FILTER |
| 102 | FIRST SWITCHING NOTCH FILTER |
| 103 | SECOND SWITCHING NOTCH FILTER |
| 104, 105 | CAPACITOR |
| 106 | INDUCTOR |
| 107 | FIRST SWITCH |
| 108 | FIRST COUPLING CAPACITOR |
| 109 | FIRST RESONATOR |
| 110 | SECOND SWITCH |
| 111 | SECOND COUPLING CAPACITOR |
| 112 | SECOND RESONATOR |
| 113 | OUTPUT TERMINAL |
| 114 | INPUT TERMINAL |
| 115 | FIRST CONTROL TERMINAL |
| 116 | SECOND CONTROL TERMINAL |

PREFERRED EMBODIMENTS OF THE INVENTION

Hereinafter, the embodiments of the present invention be described with reference to the drawings.

First Embodiment

In the first embodiment, various types of composite filters which can be used as one component of the antenna duplexer to be described in a second embodiment will be described.

Figure 1:
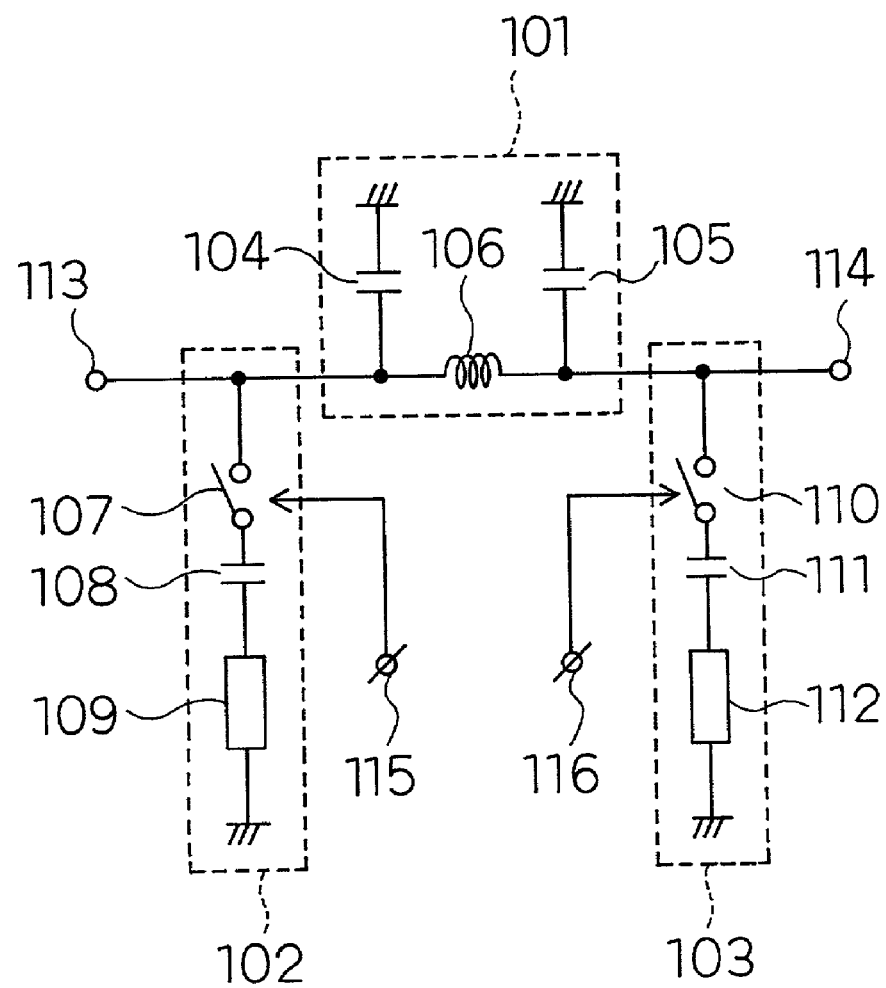
FIG. 1 is a block diagram of a composite filter in a first embodiment of the present invention.

FIG. 1 shows schematically a composite filter of the first embodiment.

The composite filter shown in FIG. 1 is constituted by a low-pass filter 101, which is a transmitting circuit, and a first and second switching notch filters 102, 103. The low-pass filter 101 is a π type circuit which is constituted by a first and a second capacitors 104, 105 and an inductor 106. Further, the first notch filter 102 is connected in series to a first switch 107, a first capacitor 108 and a first resonator 109. One end of the first resonator 108 is grounded. The second notch filter 103 is connected in series to a second switch 110, a second capacitor 111 and a second resonator 112. One end of the second resonator is grounded.

Here, the first resonator 109 is a line of λ/4 length and forms a series resonance circuit by the capacitor 108 and the resonator 109. Reference numeral 102 becomes a switching notch filter. Similarly, the second resonator 112 is a line of λ/4 length and forms a series resonance circuit by the capacitor 111 and the resonator 112. Reference numeral 103 becomes a notch filter.

When the first resonator 109 is a line of λ/2 length, one end of the resonator 109 is opened. Similarly, when the second resonator 112 is a line of λ/2 length, one end of the resonator 112 is opened.

The first switching notch filter 102 is connected between an output terminal 113 and low-pass filter 101. The second switching notch filter 103 is connected between an input terminal 114 and the low-pass filter 101. Further, the first and the second notch filters 102, 103 are adjusted so that an attenuation pole is positioned in a desired frequency. Further, the first and the second notch filters 102, 103 are connected with a first and a second control terminals 115, 116, and ON/OFF states of a first and a second switches 107, 110 which constitute the first and the second switching notch filters 102, 103 are controlled by the first and the second control terminals 115, 116.

In the above described composite filter, when the first and the second switches 107, 110 are in an ON state, a passing characteristic from the above described input terminal 113 to the above described output terminal 114 attains a characteristic superposed with a characteristic having the attenuation pole formed by the characteristic of the low-pass filter 101 which is the transmitting circuit, the capacitors 108, 111 of the switching notch filters 102, 103 and the resonators 109, 112 and, therefore, the composite filter becomes a low-pass filter having the attenuation pole and can secure attenuation in a desired frequency. Further, in the above described filter, when the first and the second switches 107, 110 are in an OFF state, the above described capacitors 108, 111 and the above described resonators 109, 112 are electrically separated from the above described input terminal 113 and the above described output terminal 114, and the passing characteristic from the above described input terminal 113 to the above described output terminal 114 attains an almost directly connected characteristic. Hence, the above described composite filter simply becomes a low-pass filter, thereby reducing a loss of a pass-band.

As described above, the composite filter of the present embodiment can secure the attenuation in the desired frequency and can reduce a loss of the pass-band by switching a notch.

Figure 2:
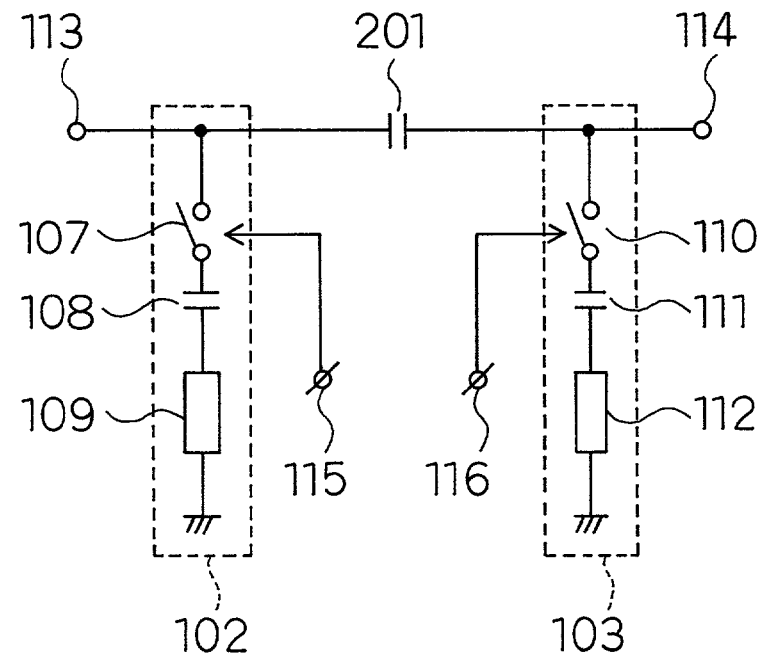
FIG. 2 is another block diagram of the composite filter in the first embodiment of the present invention.
Figure 2:
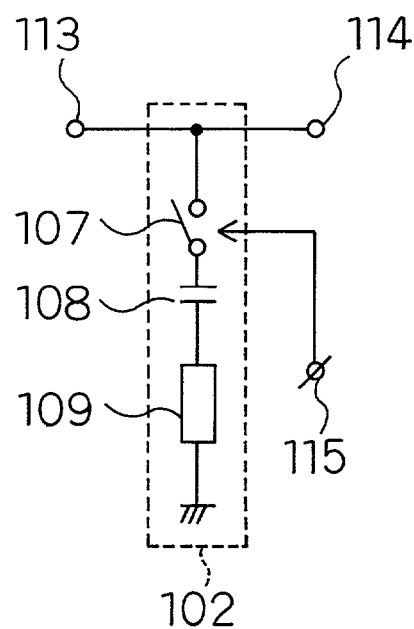

Note that, in the present embodiment, as shown in FIG. 2A, a capacitor 201 may be used in place of the low-pass filter 101, which is the transmitting circuit. In this case, when the switches 107, 110 are in an ON state, the filter attains a constitution of the composite filter having the attenuation pole and, when the switches 107, 110 are in an OFF state, the switching notch filter is separated from a signal path, and the input terminal 113 and the output terminal 114 attains a constitution being connected via a capacitor so that a low-loss can be realized. Instead of arranging the capacitor 201, the output terminal 113 and the input terminal 114 may be directly connected by using a strip line as a transmitting circuit.

When the switching notch filter is only one piece, as shown in FIG. 2B, the input terminal 114 and the output terminal 113 may be connected without interposing the transmitting circuit.

Figure 11:
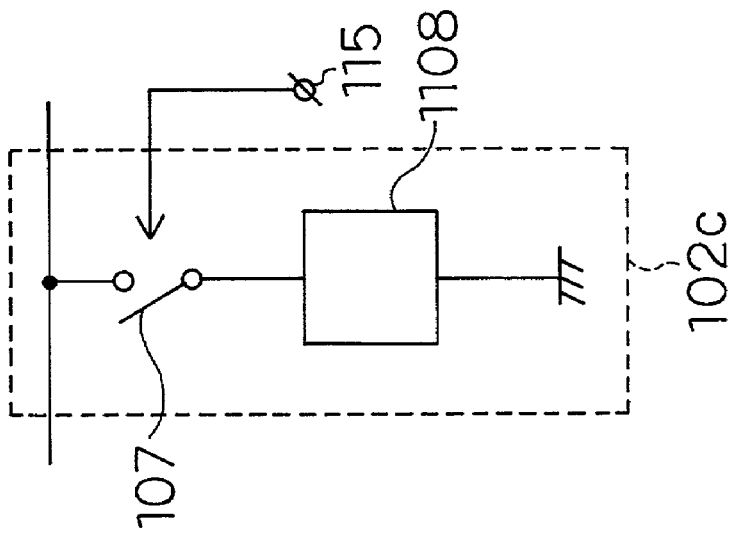
FIG. 11A is a view showing another constitution of the switching notch filter, which constitutes the composite filter in the first embodiment of the present invention.
FIG. 11B is a view showing another constitution of the switching notch filter, which constitutes the composite filter in the first embodiment of the present invention.
FIG. 11C is a view showing another constitution of the switching notch filter, which constitutes the composite filter in the first embodiment of the present invention.
Figure 11:
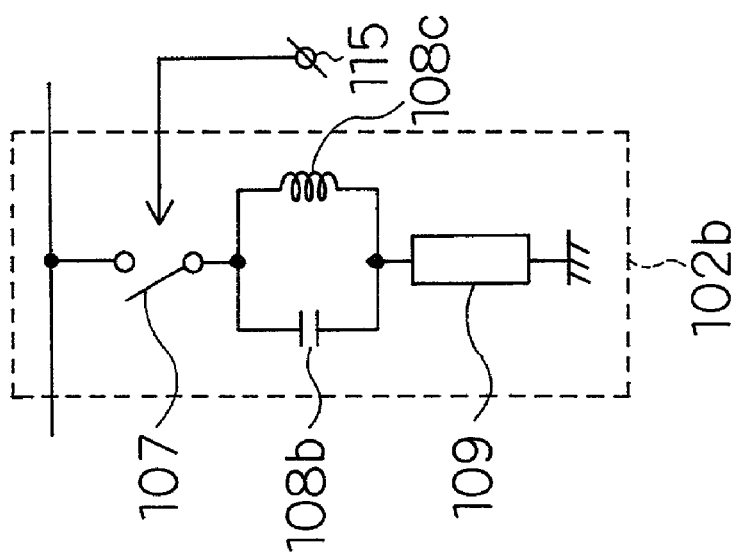
Figure 11:
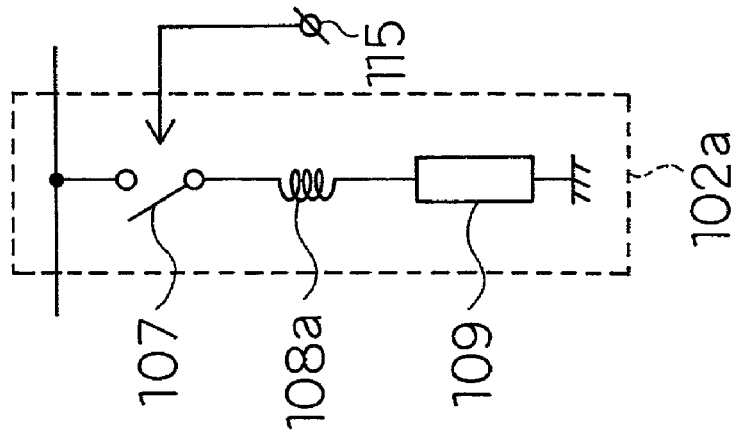

Further, in place of the first switching notch filter 102 and the second switching notch filter 103, those having the constitutions as shown in FIG. 11 can be also used, respectively. That is, a switching notch filter 102a shown in FIG. 11A has a constitution which replaces the capacitor 108 of switching notch filter 102 shown in FIG. 1 by an inductor 108a. That is, in the switching notch filter 102a of FIG. 11A, the switch 107, the inductor 108a and the resonator 10 are connected in series, and the inductor 108a and the resonator 109 form a series resonance circuit. One end of the resonator 109 is grounded. Further, the switch 107 is connected with the control terminal 115.

Further, the switching notch filter 102b shown in FIG. 11B has a constitution, wherein the capacitor 108 of the switching notch filter 102 shown in FIG. 1 is replaced by a circuit in which the capacitor 108b and the inductor 108c are connected in parallel. That is, in the switching notch filter 102b of FIG. 1B, between the switch 107 and the resonator 109, there is connected a circuit in which the capacitor 108b and the inductor 108c are connected in parallel. One end of the resonator 109 is grounded. The switch 107 is connected with the control terminal 115.

Further, the switching notch filter 102c shown in FIG. 11C has a constitution, wherein the resonance circuit constituted by the capacitor 108 of the switching notch filter 102 of FIG. 1 and the resonator 109 is replaced by an surface acoustic wave filter 1108. That is, the switching notch filter 102c of FIG. 11C has the surface acoustic wave filter 1108 connected to the switch 107 and the control terminal 115 connected to the switch 107.

In this way, even when the switching notch filters 102a, 102b, 102c are used in place of the first switching notch filter 102 and the second switching notch filter 103 of FIG. 1, the same effect equivalent to that of the present embodiment can be obtained.

Further, when the transmitting circuit is constituted by a plurality of low-pass filter stages, a constitution is also possible, wherein the switching notch filters are connected between the two adjacent low-pass filters, between the output terminal and the low-pass filter adjacent thereto and between the input terminal and the low-pass filter adjacent thereto, respectively. When such a transmitting circuit is constituted by a plurality of low-pass filter stages, notch filters may invariably be connected between the two adjacent low-pass filters, between the output terminal and the low-pass filter adjacent thereto and between the input terminal and the low-pass filter adjacent thereto. Further, being not limited to this, a constitution is also possible, wherein the switching notch filter can be connected to a portion only between the two adjacent low-pass filters, between the output terminal and the low-pass filter adjacent thereto and between the input terminal and the low-pass filter adjacent thereto.

Figure 3:
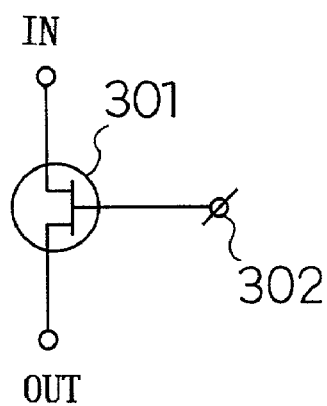
FIG. 3A is a block diagram of a switch using a FET.
FIG. 3B is a block diagram of the switch using a pin diode.
FIG. 3C is a block diagram of the switch using the pin diode and a λ/4 line.
Figure 3:
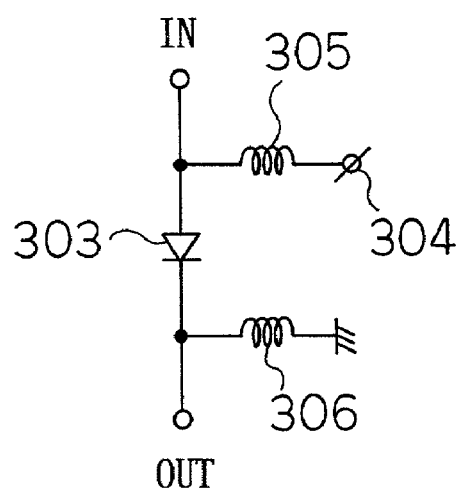
Figure 3:
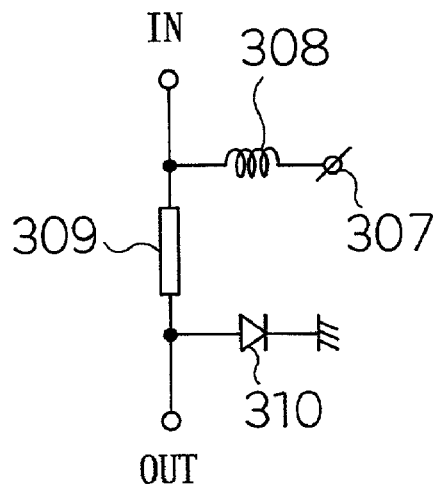

Note that, in the present embodiment, the first and the second switches 107, 110 maybe constituted by a semiconductor element such as a FET shown in FIG. 3A or by using a pin diode shown in FIGS. 3B, 3C. Even in the case of other constitution, if it is a constitution having a switch function, it also has the advantages of the present invention such as the high attenuation and low-loss. In FIG. 3, each IN terminal is the side to which the low-pass filter 101 in FIG. 1 is connected, and each OUT terminal is the side to which the capacitor 108 or 111 in FIG. 1 is connected.

FIG. 3A is one example of a switch using a FET, and a FET 301 is turned ON/OFF by a voltage of a control terminal 302.

FIG. 3B is one example of a switch using a pin diode, and the pin diode is put into a ON/OFF state by a voltage of the control terminal 304 and operates as a switch. In FIG. 3B, inductors 305, 306 play a role as choke coils.

FIG. 3C is one example of a switch using the pin diode and the λ/4 line, and the voltage of a control terminal 307 is given to a pin diode 310 via an inductor 308 and the λ/4 line 309. A cathode of the pin diode is grounded. When the pin diode is given a control voltage and put into an ON state, the impedance from IN by the λ/4 line 309 toward OUT is infinite and the switch is put into an OFF state. When the control voltage is not given, the switch is put into an ON state. Note that the λ/4 line 309 may have a constitution to use a strip line or a constitution to use a concentrated constant element such as an inductor and the like.

Note that, in the present embodiment, though the composite filter was described by using a π type low-pass filter, even when another constitution is used, or a band-pass filter, a high-pass filter or a laminated planer filter using a strip line is used, the same effect as that of the present embodiment can be obtained. Further, the number of switching notch filters and the constitution thereof are not limited to this, but if the notch filter has a constitution to select the ON/OFF of the notch, the same effect equivalent to that of the present invention can be obtained.

Note that the frequency of the attenuation pole of the composite filter in the present embodiment can be controlled by the first and the second switching notch filters, and a magnitude of the attenuation and a band width of the attenuation can be made variable.

Further, when the first and the second control terminals 115, 116 are controlled at the same time for ON/OFF, a switching notch filter having the attenuation pole of the first notch filter 102 and the attenuation pole of the second notch filter 103 can be obtained and, when either of the first or the second control terminal 115, 116 is controlled, a switching notch filter having either of the attenuation pole of the first notch filter 102 or the attenuation pole of the second notch filter 103 can be obtained, and these notch filters can be controlled depending on application and practical using state.

Further, regarding the constitution of the composite filter of the present embodiment, it may be a constitution using a dielectric coaxial resonator as a resonator which constitutes the switching notch filter, or may be a laminated structure using a distributed constant type line or a dielectric sheet. Or it may be a concentrated constant constitution using an inductor or a capacitor. In the case of the laminated structure, passive parts such as the resonator, the capacitor and the like are formed on the inner layer and, on the upper surface thereof, active parts such as the switch and the like are mounted so that further miniaturization can be realized.

Further, in the composite filter of the present embodiment, the number of resonators required for the notches and the constitution thereof are not limited to this, but if it is the constitution where the ON/OFF of the notch is selected by the switch, the effect of the present embodiment can be similarly obtained.

Figure 12:
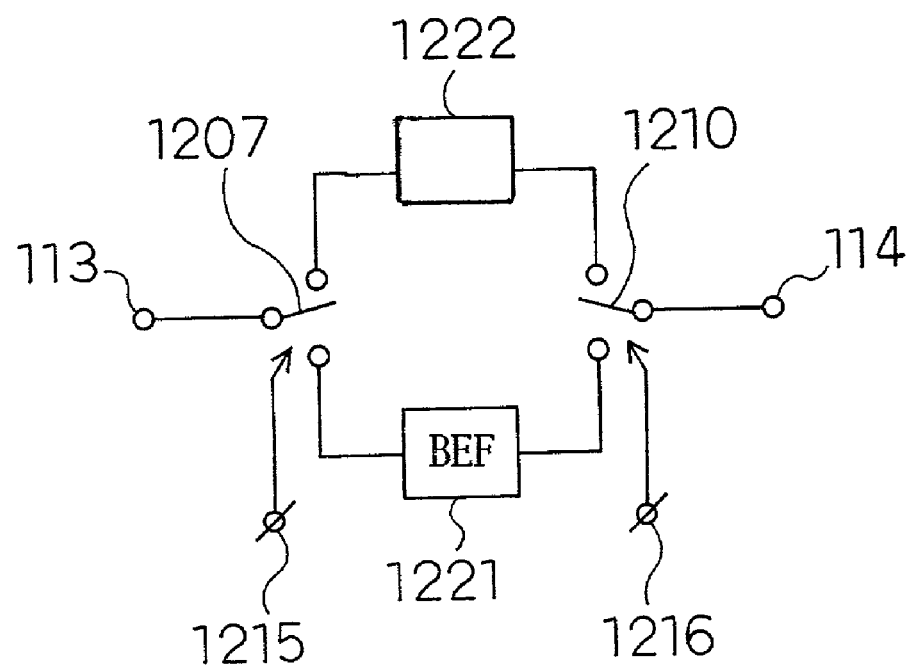
FIG. 12 is a view showing another constitution of the composite filter in the first embodiment of the present invention.

Further, the composite filter of a different constitution from the above described composite filter is shown in FIG. 12. The composite filter of the constitution of FIG. 12 can be similarly used as one component of the antenna duplexer to be described subsequent to a second embodiment.

The composite filter shown in FIG. 12 has a constitution, wherein a first switch 1207 is connected to the input terminal 113, and a second switch 1210 is connected to the output terminal 114, and a transmitting circuit 1222 and a notch filter 1221 are connected between the first switch 1207 and the second switch 1210. Further, the switch 1207 and the switch 1210 are connected with a control terminal 1215 and a control terminal 1216, respectively. Here, by using an surface acoustic wave filter for the notch filter 1221, the composite filter of FIG. 12 can be further miniaturized.

In the above described composite filter, when the first and the second switches 1207, 1210 are in an ON state of BEF side, the passing characteristic from the input terminal 113 to the output terminal 114 has a characteristic of the notch filter 1221 are connected in parallel and, therefore, the composite filter has a characteristic with an attenuation pole and can secure the attenuation in the desired frequency.

Further, in the above described composite filter, when the first and the second switches 107, 110 are in an ON state of the transmitting circuit, passing characteristics to the above described input terminal 113 and to the above described output terminal 114 become characteristics of transmitting circuit, and when the transmission line is a capacitor or low pass filter, the above described composite filter allows reduction of the loss in the passing band without attenuation poles.

As described above, the composite filter of the present embodiment can secure the attenuation in the desired frequency and, further, can reduce a loss of the pass-band by selecting the notches.

Second Embodiment

Hereinafter, an antenna duplexer of a second embodiment of the present invention will be described with reference to the drawings. The antenna duplexer of the second embodiment uses various composite filters described in the first embodiment as its one component.

Figure 4:
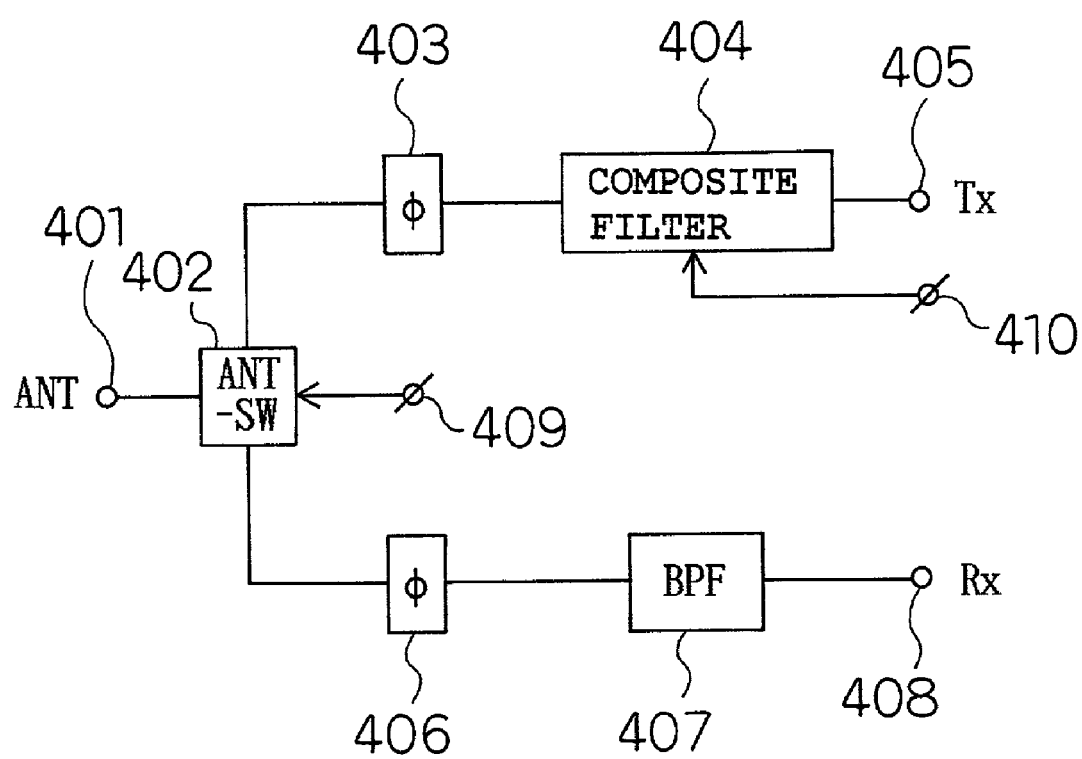
FIG. 4 is a block diagram of an antenna duplexer in s second embodiment of the present invention.

A schematic diagram of the antenna duplexer in the second embodiment is shown in FIG. 4

In FIG. 4, an antenna terminal (ANT) 401 is connected to a transmitting terminal (Tx) 405 via an antenna switch (ANT-SW) 402, a transmitting phase-shift circuit (φ) 403 and a composite filter 404 as a transmitting filter. Further, the antenna terminal (ANT) 401 is connected to a receiving terminal (Rx) 408 via an antenna switch 402, a receiving phase-shift circuit (φ) 406, a band-pass filter (BPF) 407 as a receiving filter. The antenna terminal 402 is connected with an antenna control terminal 409, which performs a switch control. Further, the composite filter 404 is connected with a control terminal 410.

In FIG. 4, in the case where the composite filter shown in the first embodiment as the transmitting filter is used, when the system is of the non-simultaneous transmission and reception, the antenna switch 402 switches the transmitted and received signals by time division. At this time, the switching notch filter having the attenuation pole of the composite filter 404 is separated and put into an OFF state, and the composite filter 404 becomes a low-pass filter (LPF)

Further, when the system is of the simultaneous transmission and reception, the antenna switch 402 has a constitution, wherein the antenna terminal 401, the transmitting phase-shit circuit 403 and the receiving phase-shift circuit 406 are connected. At this time, by putting the composite filter 404 into an ON state, the switch 404 has a constitution of a low-pass filter (LPF) having the attenuation pole in a receiving band. At this time, the transmitting phase-shift circuit 403 is adjusted so that the impedance of the receiving band from the receiving side toward the transmitting side of the antenna switch 402 is in an open state.

Note that, in the above description of FIG. 4, though the composite filter 404 shown in the first embodiment was described as the transmitting filter, the present embodiment is not limited to this, and the ordinary low-pass filter and band-pass filter may be also used.

Next, the composite filter 404 in FIG. 4 will be described more in detail. The composite filter 404 has a constitution of FIG. 1 in the first embodiment, and a first and a second switching notch filters 102, 103 are adjusted so that the attenuation pole is positioned at the desired frequency. This case has a constitution, wherein the attenuation pole is positioned at a received frequency band of the system. In the composite filter 404, when the system is of the simultaneous transmission and reception, a first and a second switches 107, 110 are put into an ON state, and the composite filter 404 becomes a low-pass filter having a notch characteristic so that a leakage of transmitted signals to the receiving side can be reduced.

Further, in the composite filter 404, when the system is of the non-simultaneous transmission and reception, the first and the second switches 107,110 are put into an OFF state, and the composite filter 404 becomes a low-pass filter so that a loss of the pass-band can be reduced.

Figure 5:
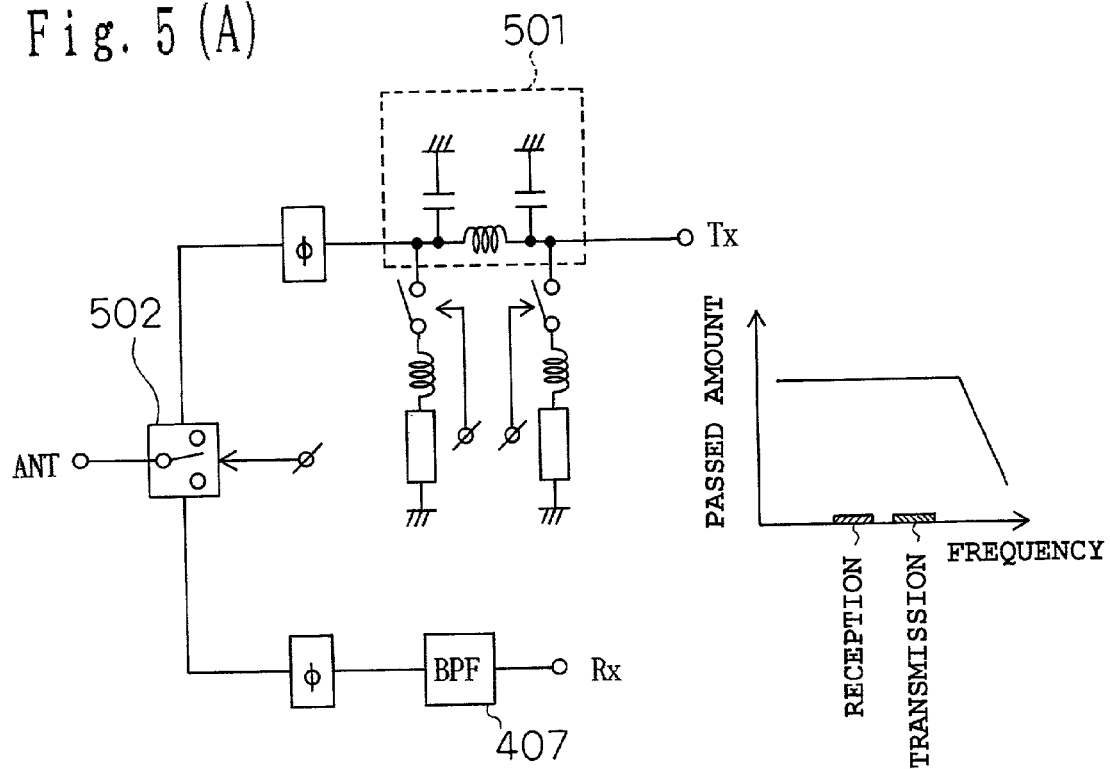
FIG. 5A is a block diagram of the antenna duplexer in the case of a non-simultaneous transmission and reception.
FIG. 5B is a block diagram of the antenna duplexer in the case of a simultaneous transmission and reception.
Figure 5:
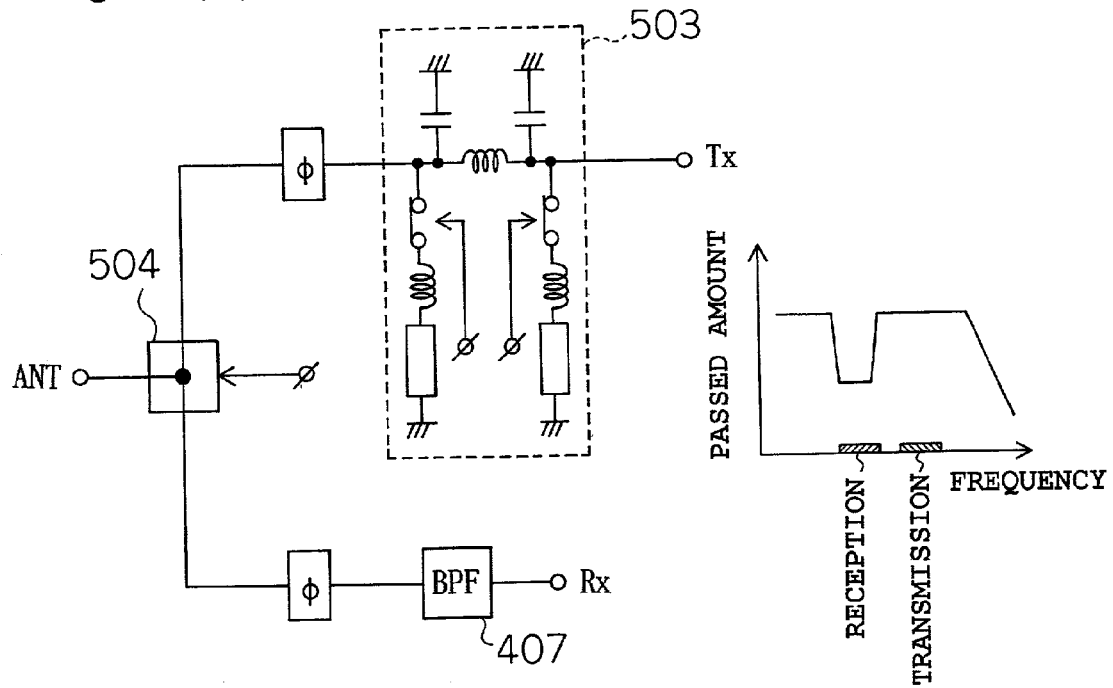

A schematic block diagram of the antenna duplexer at the simultaneous transmission and reception time and at the non-simultaneous transmission and reception time is shown in FIG. 5. FIG. 5A is a schematic block diagram of the antenna duplexer at the non-simultaneous transmission and reception time, and FIG. 5B is a schematic block diagram of the antenna duplexer at the simultaneous transmission and reception time. For example, in a PDC system, the frequency relationship between transmission and reception is similar to that of the characteristic schematically shown in FIG. 5. As shown in FIG. 5A, in the case of the non-simultaneous transmission and reception, the composite filter 404 becomes a low-pass filter and has a constitution of a switch filter, wherein the antenna duplexer switches a signal pass between a low pass filter 501 of the transmitting side and a band-pass filter 407 of the receiving side by the antenna switch 502 by time division. At this time, the switch of the switching notch filter is in an OFF state, and the characteristic has a characteristic as shown in FIG. 5A which allows the transmitted frequency to pass and the frequency higher than that to be attenuated.

Further, as shown in FIG. 5B, in the case of the simultaneous transmission and reception, since the switch of the switching notch filter is put into an ON state, the composite filter 404 becomes a low-pass filter 503 having the attenuation pole and has a constitution, wherein the antenna duplexer has a low-pass filter 503 having the attenuation pole at the transmitting side and a band-pass filter 407 at the receiving side. At this time, an antenna switch 504 has a constitution, wherein the antenna terminal is connected entirely to the transmitting side and the receiving side. At this time, the characteristic of the switching notch filter has a characteristic as shown in FIG. 5B which allows the transmitted frequency to pass and the frequency higher than that to attenuate and, further, has an attenuation pole in the received frequency band. Here, however, the selector notch filter of the composite filter 404 has a constitution as shown in FIG. 11A.

Figure 6:
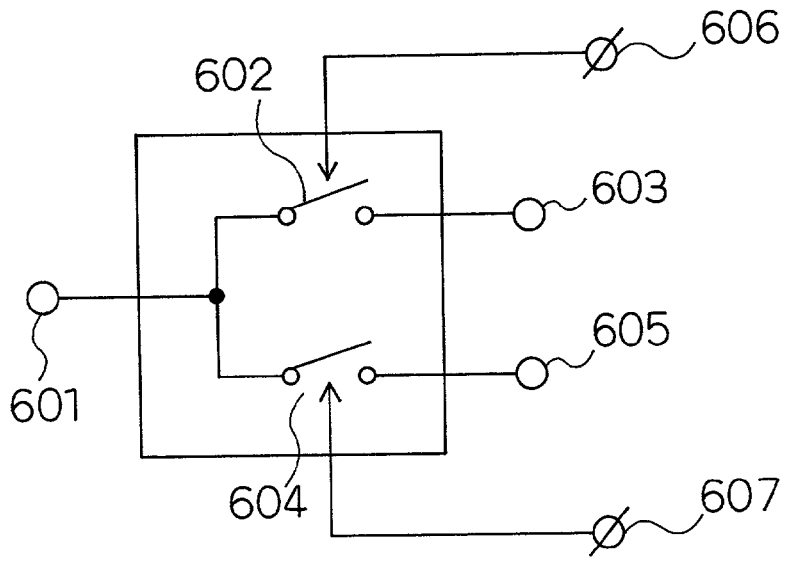
FIG. 6A is a block diagram of an antenna switch.
FIG. 6B is a block diagram of the antenna switch and a control terminal of a switching notch filter.
Figure 6:
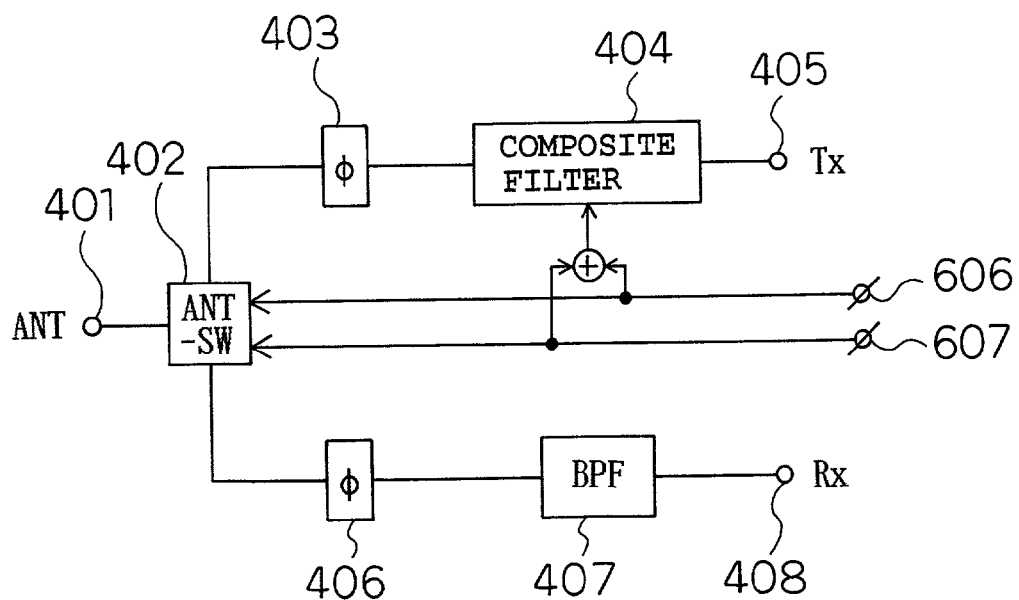

One example of the constitution of the antenna switch is shown in FIG. 6A. An antenna terminal 601 is connected to a transmitting side 603 via a first internal switch 602. Further, the antenna terminal 601 is connected to a receiving side 605 via a second internal switch 604. The first and the second internal switches are connected with a first and a second antenna control terminals 606, 607. The antenna switch operates as the antenna switch 502 shown in FIG. 5A by switching the first and the second antenna control terminals 606, 607 and operates as the antenna switch 504 as shown in FIG. 5B by putting the first and the second antenna control terminals 606, 607 into an ON state at the same time.

Further, the constitutions of respective control terminals of the antenna switch and the switching notch filter preferably have control systems associated with each other. For example, they are made common to the constitution as shown in FIG. 6B and can be controlled at the same time. In FIG. 6B, when both of the first and the second antenna terminals are in an ON state, a constitution is such that an ON signal is transmitted to the first and the second control terminals. Here, assuming that the first and the second control terminals are in common, the control terminal, which is inputted to the composite filter 404, is taken as one piece. By constituting in this way, the number of control terminals can be reduced, and it is possible to miniaturize a scale of circuit and reduce a control signal line in case of being used in the mobile communication device.

As described above, the present invention controls the switch, which handles individually the transmitted and received signals, and the switching notch filter arranged at the transmitting side so that a miniature antenna duplexer can be realized, which has a low-loss characteristic at the non-simultaneous transmission and reception time and makes the attenuation between transmission and reception larger at the simultaneous transmission and reception time, and the miniaturization of the mobile communication device can be further realized.

Note that the number of control terminals, the number of switching notch filter stages and the constitution of the antenna switch described in the present embodiment are not limited to this, but can be adjusted depending on the system and the desired characteristic.

Note that, in the present embodiment, though the composite filter 404 was described by using a π type low-pass filter, even when another constitution is used, or a band-pass filter or a laminated planer filter using a strip line is used, the same effect as that of the present invention can be obtained. Further, the number of switching notch filters and the constitution thereof are not limited to this, but if the notch filter has a constitution to select the ON/OFF of the notch, the same effect equivalent to that of the present invention can be obtained.

Further, though the composite filter 404 was described by using a π type low-pass filter, this may have a constitution using a capacitor as shown in FIG. 2A or may have a constitution where the output terminal 113 and the input terminal 114 are directly connected without arranging the low-pass filter. In this case, a low-loss can be further realized. When the switching notch filter is either 102 or 103, the input terminal 114 and the output terminal 113 may be connected without interposing the transmitting circuit as shown in FIG. 2B.

Further, the band-pass filter 407 of the receiving side may have the characteristic of the band-pass element filter or other filter, and the constitution may have a filter using a surface acoustic wave filter or a dielectric. When the surface acoustic wave filter is used, miniaturization and high attenuation characteristic can be realized and it is possible to realize high performance of the mobile communication device.

Further, in the present embodiment, the switch 402 may be constituted by a semiconductor IC, or may be constituted by a pin diode.

Note that the phase-shift circuit shown in the present embodiment may have a constitution using the strip line or a constitution using a concentrated constant element such as an inductor and the like.

Further, in the case of the simultaneous transmission and reception as compared to the case of the non-simultaneous transmission and reception, though a loss becomes slightly larger after the switching notch filter is added to the low-pass filter of the transmitting side, an output level transmitted to the antenna terminal can be increased to meet a desired magnitude by adjusting an output level of a transmitting amplifier of the preceding stage. Preferably, the output level of the transmitting amplifier can be adjusted by increasing the power supply voltage of it with consideration of efficiency or the like.

Further, in the present embodiment, though the constitution comprising the antenna switch (ANT-SW) 402 wherein the antenna duplexer is controlled by the signal from the control terminal was described, it may be a constitution not comprising the antenna switch (ANT-SW) 402. That is, the connection between the antenna terminal 504 and the transmitting phase-shit circuit and the receiving phase-shit circuit always has the constitution shown in FIG. 5B always in the case of the simultaneous transmission and reception as well as the non-simultaneous transmission and reception, and a composite filter 503 performs the same operation as the operation of the present embodiment. Even in this case, if the transmitting phase-shift circuit and the receiving phase-shift circuit are adjusted so that the impedance from the antenna terminal toward the transmitting phase-shift circuit in the received frequency is opened and the impedance from the antenna terminal toward the receiving phase-shift circuit in the transmitted frequency are opened, the same effect as that of the present embodiment can be obtained.

Further, the transmitting-receiving phase circuit may be integrated into the transmitting-receiving filter. This phase circuit is for the purpose of adjusting respective impedances and, if operated as the sharing unit, can obtain the same effect as that of the present invention.

Third Embodiment

Figure 7:
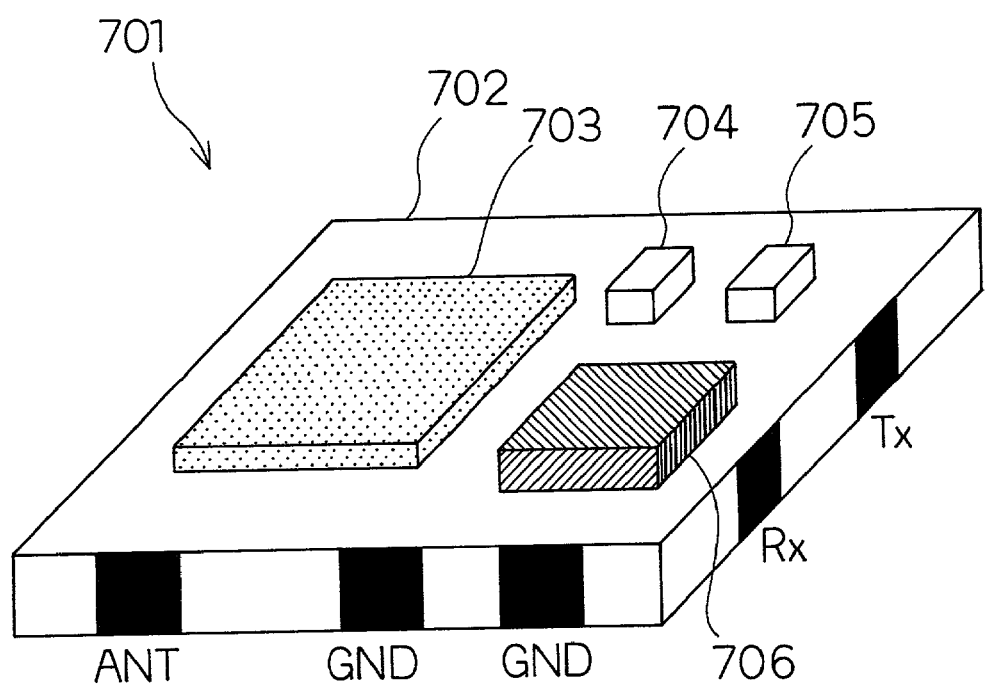
FIG. 7 is a block diagram of an antenna duplexer in a third embodiment of the present invention.

Next, a constitution of an antenna duplexer of a third embodiment of the present invention will be described. Shown in FIG. 7 is a block diagram of the antenna duplexer. An antenna 701 is constituted on a laminated filter 702 comprising a dielectric by an antenna switch 703 which handles individually the transmitted and received signals, a first and a second switches 704, 705 which constitute a switching notch filter, and an surface acoustic wave filter 706 which is arranged at the receiving side. Among each layer in the interior of the laminated filter 702, there are interposed the components of a transmitting phase-shift circuit, a receiving phase-shift circuit and the switching notch filter of the transmitting side.

Further, the side surface of the laminated filter 702 is provided with an antenna terminal (ANT), a transmitting terminal (Tx) a receiving terminal (Rx), a ground terminal (GND) and a switch selector control terminal (CONT). In order to form a constitution of the antenna duplexer shown in FIG. 4, these terminals are connected by using a via hole, a strip line inside the laminated filter and a line of the upper portion of the laminated filter 702 so as to constitute the antenna duplexer 701. The operation of the antenna duplexer 701 is the same as that of the first embodiment of the present invention.

As described above, the present invention turns ON/OFF the switch which handles individually the transmitted and received signals and the notch of the filter arranged at the transmitting side so that a low-loss can be realized at the non-simultaneous transmission and reception time and the attenuation between transmission and reception can be made larger at the simultaneous transmission and reception time and, further, a constitution using the laminated filter is adopted so that further miniaturization of the antenna duplexer can be realized and miniaturization of the mobile communication device can be also realized.

Note that, in the present embodiment, though the switch 703, the first switch 704 and the second switch 705 were described as a separate element, these switches may be integrated and, in that case, still more miniaturization can be realized.

Further, regarding the switching notch filters arranged inside the laminated filter, there are available filters which use the filters and the strip lines formed resonator by the concentrated constant elements such as inductance and capacity, and these filters are selected according to the desired characteristic, or may be a combination of these characteristics.

Note that the position and the number of antenna terminals (ANT), transmitting terminals (Tx), receiving terminals (Rx) ground terminals (GND) and switch selector control terminals (CONT) which are arranged at the side surface of the laminated filter 702 are not limited to this, but can be selected depending on systems and peripheral circuit constitutions. These terminals may be not limited to the side surface, but may be arranged at the base of the laminated filter by using the via hole.

Note that, regardless of whether or not the switch and the surface acoustic wave filter are a package-mounted or a chip-mounted, the effect of the present invention is the same.

While the switches 703, 704 and 705 are discrete parts, they may also be integrated. Such integration provides a more simplified circuitry.

Forth Embodiment

Figure 8:
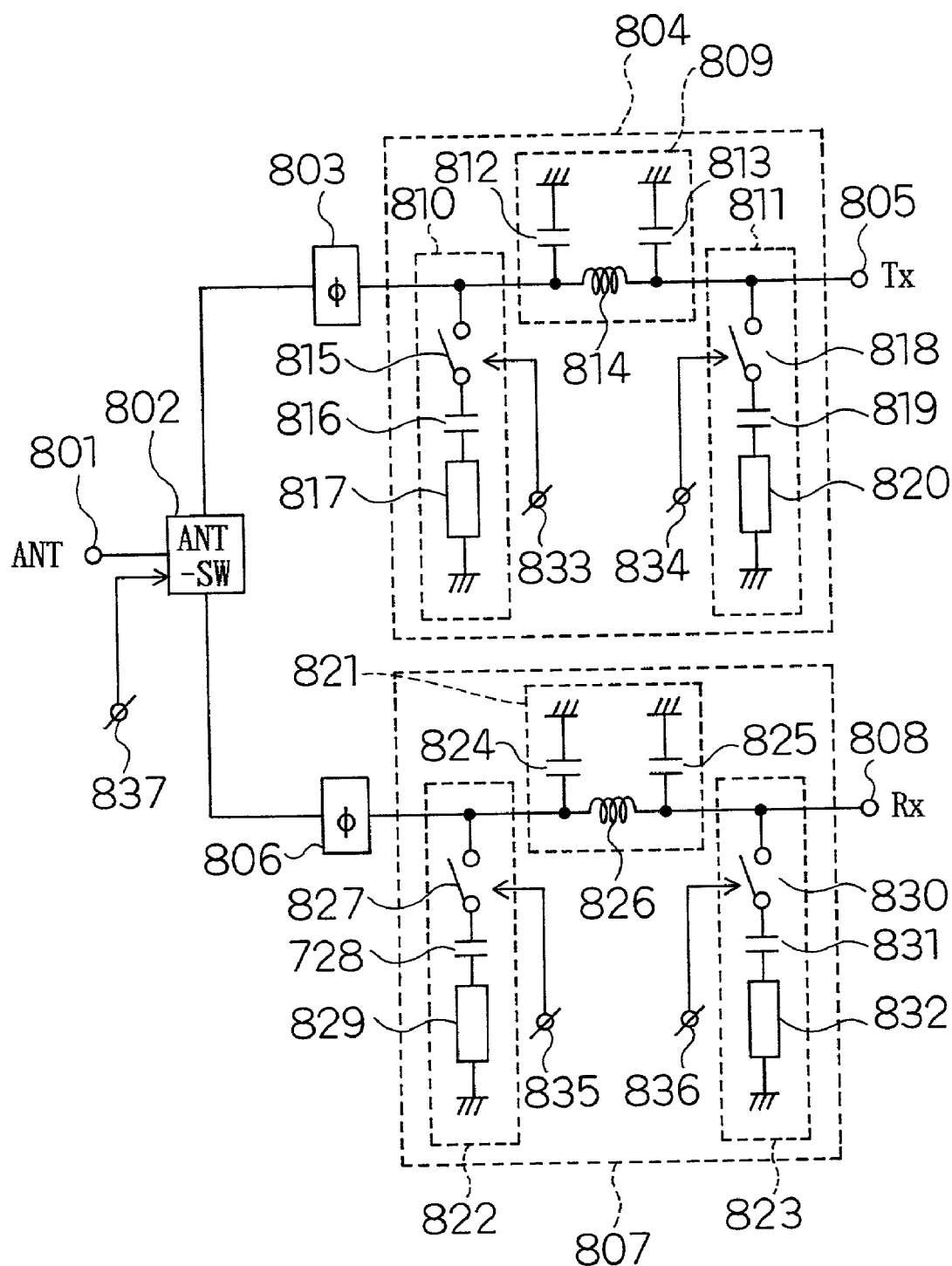
FIG. 8 is a block diagram of an antenna duplexer in a fourth embodiment of the present invention.

Next, a constitution of an antenna duplexer of a fourth embodiment of the present invention will be described. In FIG. 8, an antenna terminal (ANT) 801 is connected to a transmitting terminal (Tx) 805 via an antenna switch (ANT-SW) 802, a transmitting phase-shift circuit 803 and a transmitting filter 804. Further, the antenna terminal (ANT) 801 is connected to a receiving terminal (Rx) 808 via a switch 802, a receiving phase-shift circuit 806 and a receiving filter 807.

The transmitting filter 804 is constituted by a first low-pass filter 809 and a first and a second notch filters 810, 811. The first low-pass filter 809 is a π type circuit constituted by a first and a second capacitors 812, 813 and a first inductor 814. The first switching notch filter 810 has a first switch 815, a first capacitor 816 and a first resonator 817 connected in series. One end of the first resonator 817 is grounded. The second switching notch filter 811 has a second switch 818, a second capacitor 819 and a second resonator 820 connected in series. One end of the second resonator 820 is grounded. The first switching notch filter 810 is connected between the transmitting phase-shift circuit 803 and the low-pass filter 809. The second switching notch filter 811 is connected between the transmitting terminal 805 and the first low-pass filter 809. Further, the first and the second switching notch filters 810, 811 are adjusted so that an attenuation pole is positioned at the desired frequency. This case have a constitution wherein the attenuation pole is positioned at the received frequency band of the system.

The receiving filter 807 is constituted by a second low-pass filter 821 and a third and a fourth switching notch filters 822, 823. The second low-pass filter 821 is a π type circuit constituted by a third and a fourth capacitors 824, 825 and a second inductor 826. Further, the third switching notch filter 822 has a third switch 827, a third capacitor 828 and a third resonator 829 connected in series. One end of the third resonator 829 is grounded. The fourth switching notch filter 823 has a fourth switch 830, a fourth capacitor 831 and a fourth resonator 832 connected in series. One end of the fourth resonator 832 is grounded. The third switching notch filter 822 is connected between the receiving phase-shift circuit 806 and the low-pass filter 821. The fourth switching notch filter 823 is connected between the receiving terminal 808 and the low-pass filter 821. Further, the second and the fourth switching notch filters 822, 823 are adjusted so that the attenuation pole is positioned at the desired frequency. This case has a constitution wherein the attenuation pole is positioned at the transmitted frequency band of the system.

Further, the first, the second, the third and the fourth switching notch filters are connected with a first, a second, a third and a fourth control terminals 833, 834, 835, 836, respectively, and the antenna switch 802 is connected with the antenna control terminal 837.

In FIG. 8, when the system is of the non-simultaneous transmission and reception, the antenna switch 802 has a characteristic which switches the transmitted and received signals by time division. At this time, the switching notch filter having the attenuation pole of the transmitting filter 804 is separated and put into an OFF state, and the transmitting filter 804 becomes a simple low-pass filter so that a loss of the pass-band can be reduced. Also, the switching notch filter having the attenuation pole of the transmitting filter 807 is separated and put into an OFF state, and the transmitting filter 807 becomes a simple low-pass filter so that a loss of the pass-band can be reduced.

In FIG. 8, when the system is of the simultaneous transmission and reception, the antenna switch 802 has a characteristic which connects the antenna terminal 801, the transmitting phase-shit circuit 803 and the receiving side phase-sift circuit 806. At this time, the transmitting filter 804 has a constitution of the low-band filter having the attenuation pole in the receiving band so that a leakage of the transmitted signal to the receiving side can be reduced. At this time, the transmitting phase-shift circuit 803 is adjusted so that the impedance of the receiving band from the receiving side toward the transmitting side of the antenna switch 802 is opened.

Further, the receiving filter 807 has a constitution of the low-pass filter having the attenuation pole in the transmitted band so that a leakage of the transmitted signal to the receiving terminal 808 can be reduced. At this time, the transmitting phase-shift circuit 803 is adjusted so that the impedance of the receiving band from the transmitting side toward the receiving side of the antenna switch 802 is opened. In this way, in the case of the simultaneous transmission and reception, the transmitting and the receiving phase-shift circuits 803, 807 mutually open the impedance so that they can operate as the sharing unit.

As described above, according to the present embodiment, by turning ON/OFF the switch, which handles individually the transmitted and received signals, and the notches of the filters arranged at the transmitting side and the receiving side, a smaller antenna duplexer can be realized, which has a low-loss characteristic at the non-simultaneous transmission and reception time and makes the attenuation between transmission and reception larger at the simultaneous transmission and reception time. Also, a smaller mobile communication device can be realized.

Note that, in the present embodiment, though the transmission and reception switching notch filters 804, 807 were described by using a π type low-pass filter, even when another constitution is used, or a band-pass filter and a laminated planer filter using a strip line, the same effect as that of the present invention can be obtained. Further, the number of switching notch filters and the constitution thereof are not limited to this, but if the switching notch filter has a constitution to select the ON/OFF of the notch, the same effect equivalent to that of the present invention can be obtained. Note that the number of control terminals, the number of switching notch filter stages and the constitution of the antenna switch described in the present embodiment are not limited to this, but can be adjusted depending on the system and the desired characteristic.

Further, though the switching notch filters 804, 807 were described by using a π type low-pass filter, they may have a constitution using a capacitor as shown in FIG. 2A or may have a constitution where the output terminal 113 and the input terminal 114 are directly connected without arranging the low-pass filter. In this case, a low-loss can be further realized. When the switching notch filter is either 102 or 103, the input terminal 114 and the output terminal 113 may be connected without interposing the transmitting circuit as shown in FIG. 2B.

Further, they may have a constitution wherein the surface acoustic wave filter, the filter using the dielectric and the like are added at the receiving side. In this case, it is possible to further secure the attenuation outside the pass-band.

Further, in the present embodiment, the first, the second, the third, the fourth switches 815, 818, 827, 830 which are arranged inside the switch 802 and the switching notch filter may be constituted by a semiconductor IC or by using a pin diode.

Note that the phase-shift circuit shown in the present embodiment may be constituted by using a strip line or by using a concentrated constant element such as the inductor and the like.

Further, in the case of the simultaneous transmission and reception as compared to the case of the non-simultaneous transmission and reception, though a loss becomes slightly larger after the switching notch filter is added to the low-pass filter of the transmitting side, an output level transmitted to the antenna terminal can be increased to meet a desired magnitude by adjusting an output level of a transmitting amplifier of the preceding stage. The output level of the transmitting amplifier can be adjusted by increasing the power supply voltage of it with consideration of efficiency or the like.

Further, in the present embodiment, though an example is shown wherein the composite filter having the switching notch filter is used for the transmitting filter or the receiving filter, an ordinary low-pass filter, the band-pass filter and the like may be used instead of the switching notch filter, similarly to the second embodiment.

Further, the transmitting-receiving phase circuit may be integrated into the transmitting-receiving filter. This phase circuit is for the purpose of adjusting respective impedances and, if operated as the sharing unit, can obtain the same effect as that of the present invention.

Fifth Embodiment

Figure 9:
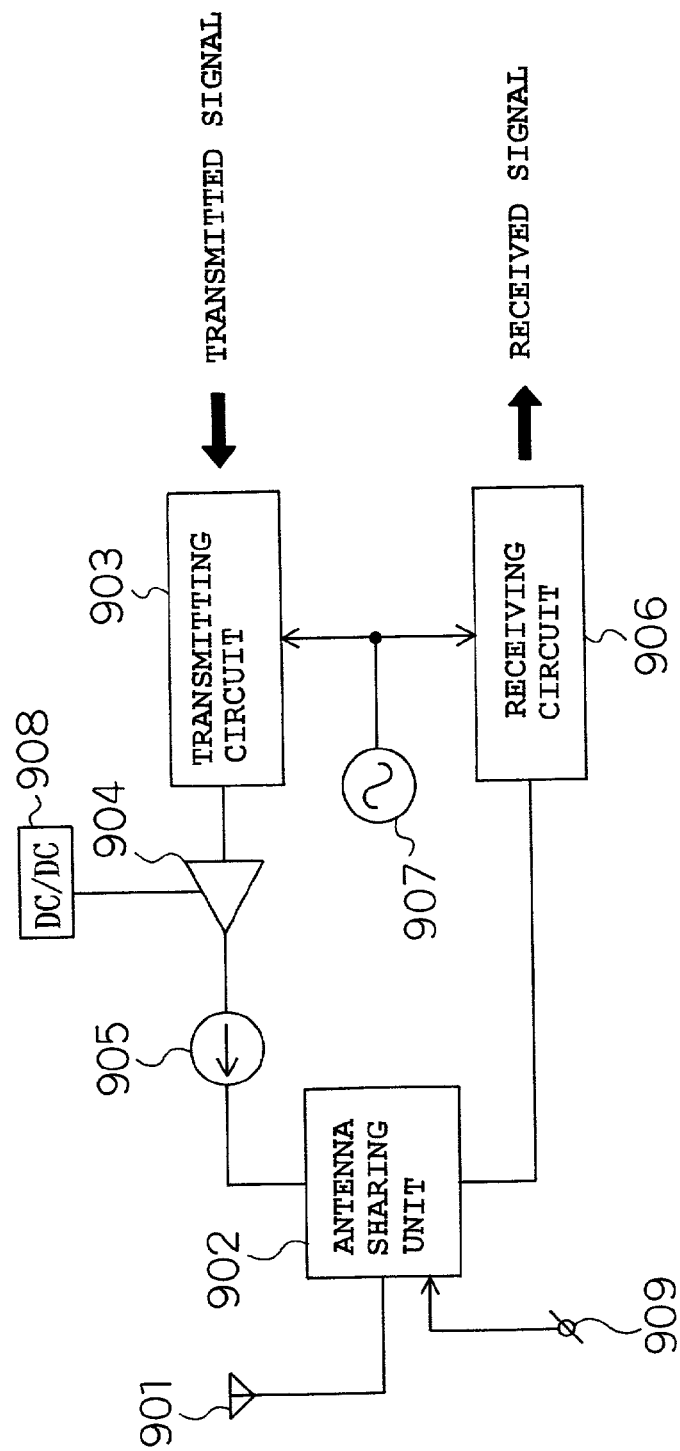
FIG. 9 is a block diagram of a mobile communication device in a fifth embodiment.
Figure 10:
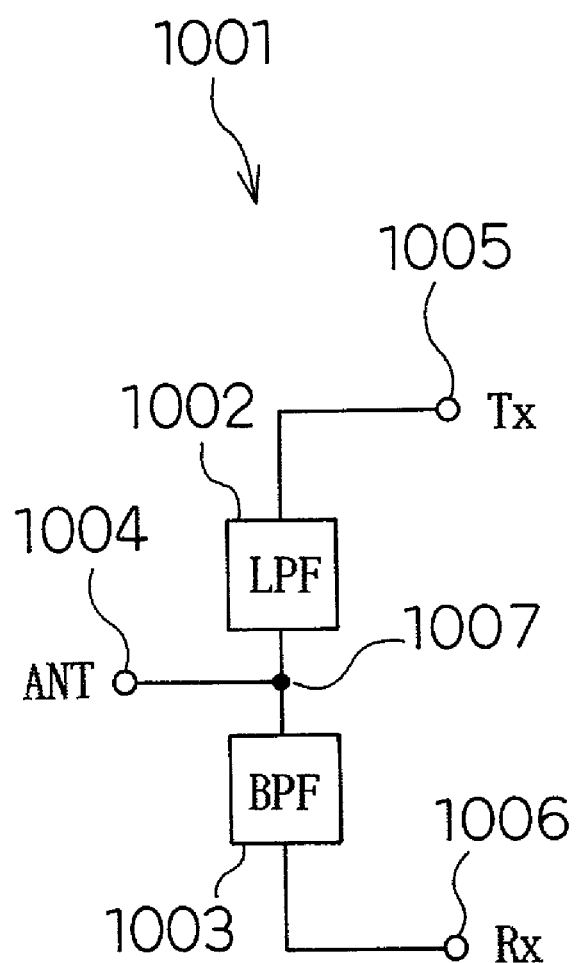
FIG. 10 is a block diagram of a conventional sharing unit.

Next, a constitution of a mobile communication device using an antenna duplexer in a fifth embodiment of the present invention will be described. FIG. 9 is a block diagram of the mobile communication device using the antenna duplexer. In FIG. 9, an antenna 901 is connected to an antenna duplexer 902. The antenna duplexer 902 has the same constitution as that shown in the second embodiment or the third embodiment or the fourth embodiment. The transmitted signal is transmitted to the antenna duplexer 902 via a transmitting circuit 903, a transmitting amplifier 904 and an isolator 905, and is transmitted from the antenna 901. The received signal is transmitted from the antenna 901 to a receiving circuit 906 via the antenna duplexer 902. The transmitting circuit 903, the receiving circuit 906 are inputted with a local signal to be used for mixing or modulating from a oscillating circuit 907. Moreover, a power supply voltage of the transmitting amplifier 904 is given via a DC/DC converter 908. The antenna duplexer is connected with a control terminal 909.

In FIG. 9, when the system is of the non-simultaneous transmission and reception, the antenna duplexer 902 becomes a transmit-receive selecting switch having a characteristic of a filter and can reduce a loss of the transmitting side. When the system is of the simultaneous transmission and reception, the antenna duplexer 902 operates as a sharing unit and handles individually the transmitted frequency and the received frequency by frequency division. This case has a constitution, wherein the transmitting side in the antenna duplexer 902 is added with the switching notch filter shown in the first embodiment, and a loss becomes slightly larger by that much. In order to compensate the loss, by directly adjusting the power supply voltage given to the transmitting amplifier 904 via the DC/DC converter 908, an output power transmitted from the antenna 901 as the mobile communication device can be secured.

As described above, according to the present embodiment, by adopting the antenna duplexer to the mobile communication device in the system where both the simultaneous transmission and reception and the non-simultaneous transmission and reception coexist, a miniature mobile communication device can be realized, which has a low-loss characteristic at the non-simultaneous transmission and reception time and makes the attenuation between transmission and reception larger at the simultaneous transmission and reception time.

Note that, in the present embodiment, though the number of control terminals of the antenna duplexer was taken as one piece, it can be adequately adjusted depending on the number of switching notch filters, the constitution of the antenna switch, the system and the desired characteristic.

Note that, in the present embodiment, though the transmitting amplifier 904 and the antenna duplexer 902 are indirectly connected via the isolator 805, they maybe directly connected without having the isolator 805.

Further, in the present embodiment, though the oscillating circuit 907 was described as one piece, even if it exists in plurality, the effect of the present invention is the same.

Further, though the switching notch filter which is the component of the antenna duplexer 902 was described by using a π type low-pass filter, this may have a constitution using the capacitor as shown in FIG. 2A or a constitution which directly connects the output terminal 113 and the input terminal 114 without arranging the low-pass filter. When the switching notch filter is either 102 or 103, the input terminal 114 and the output terminal 113 may be connected without interposing the transmitting circuit as shown in FIG. 2B. In this case, a low-loss can be further realized. In this case, if the constitution is such that the isolator 805 and the like have a low-pass filter function, the mobile communication device having still more high performance can be obtained.

As is clear from the above description, the present invention can provide an antenna duplexer and a mobile communication device using the same, which accommodates the case where a system using a frequency division system which is a simultaneous transmission and reception and a system which is not the simultaneous transmission and reception coexists.

What is claimed is:

1. An antenna duplexer comprising:
   an antenna terminal;
   a transmitting phase-shift circuit, one side of which is connected to said antenna terminal;
   a receiving phase-shift circuit, one side of which is connected to said antenna terminal;
   a transmitting filter connected to the other side of said transmitting phase-shift circuit and a transmitting terminal; and
   a receiving filter connected to the other side of said receiving phase-shift circuit and a receiving terminal;
   wherein said transmitting filter and/or said receiving filter is a composite filter, and said composite filter attains a characteristic having an attenuation pole at simultaneous transmission and reception time when transmission and reception are simultaneously performed, and controls respective impedances by said transmitting phase-shift circuit and said receiving phase-shift circuit to operate as a sharing unit and attains a characteristic where said attenuation pole is removed at non simultaneous transmission and reception time when transmission and reception are not performed simultaneously.

2. An antenna duplexer comprising:
   an antenna terminal;
   an antenna switch connected to said antenna terminal;
   a transmitting phase-shift circuit connected to the one side terminal of said antenna switch;
   a receiving phase-shift circuit connected to the other side terminal of said antenna switch;
   a transmitting filter connected to the other side of said transmitting phase-shift circuit and a transmitting terminal; and
   a receiving filter connected to the other side of said receiving phase-shift circuit and a receiving terminal;
   wherein, at a non-simultaneous transmission and reception time when transmission and reception are not performed simultaneously, said antenna switch performs an operation of switching over to time division of the operation to electrically connect said antenna terminal to said one side terminal and the operation to electrically connect said antenna terminal to said other side terminal, respectively,
   and wherein, at a simultaneous transmission and reception time when transmission and reception are performed simultaneously, said antenna switch performs the operation to connect said antenna terminal to said one side terminal and said other side terminal simultaneously.

3. The antenna duplexer according to claim 2, wherein said transmitting filter is a composite filter,
   and wherein said composite filter attains a characteristic having the attenuation pole at said simultaneous transmission and reception time, and controls respective impedances by said transmitting phase-shift circuit and said receiving phase-shift circuit so as to operate as a sharing unit and attains a characteristic where said attenuation pole is removed at non simultaneous transmission and reception time.

4. The antenna duplexer according to any one of claims 1 to 3 comprising a constitution employing a laminated filter which uses a dielectric green sheet,
   that said transmitting filter and at least the one side of said receiving filter are formed in said laminated filter, and said switch being mounted on the upper surface of said laminated filter.

5. The antenna duplexer according to any one of claims 1 to 3, wherein said receiving filter is an surface acoustic wave filter.

6. The antenna duplexer wherein said receiving filter is the composite filter according to claim 3.

7. The antenna duplexer according to claim 2 or 3, wherein, at said simultaneous transmission and reception time,
an output level of a transmitting amplifier directly or indirectly connected to said transmitting terminal is raised relative to said non-simultaneous transmission and reception.

8. The antenna duplexer according to claim 7, wherein adjustment to raise the output level of said transmitting amplifier is performed by increasing a power source voltage of said transmitting amplifier.

9. The antenna duplexer according to any of claims 1 or 3, wherein said composite filter has an input terminal, an output terminal, at least one transmitting circuit and at least not less than one switching notch filter,
said transmitting circuit is electrically connected between said input terminal and said output terminal,
said switching notch filter is connected to at least either one of the input side and output side of said transmitting circuit,
said switching notch filter has at least one switch and at least one series resonance circuit,
one end of said switch is connected between said input terminal and said output terminal,
the other end of said switch is connected to one end of said series resonance circuit, and
said switch has a control terminal to switch ON/OFF.

10. The antenna duplexer according to claim 9, wherein, when said switch is in an ON state, a passing characteristic from said input terminal to said output terminal is a characteristic superposed with the characteristic having the attenuation pole formed by the characteristic of said transmitting circuit and said series resonance circuit of said switching notch filter,
and wherein, when said switch is in an OFF state, a passing characteristic from said input terminal to said output terminal substantially becomes a characteristic which is possessed by the transmitting circuit.

11. The antenna duplexer according to claim 10, wherein said transmitting circuit is constituted by a circuit having a filter function.

12. The antenna duplexer according to claim 9, wherein said transmitting circuit is constituted by a serial connection of capacitors.

13. The antenna duplexer according to claim 9, wherein said transmitting circuit is constituted by a strip line.

14. The antenna duplexer according to claim 9, wherein said antenna duplexer has a constitution employing a laminated filter which uses a dielectric green sheet,
said switching notch filter is formed in said laminated filter, and
said switch is mounted on the upper surface of said laminated filter.

15. The antenna duplexer according to claim 2 or 3, wherein said antenna switch is integrated with another switch connected to said antenna terminal.

16. The antenna duplexer according to claim 9, wherein, at said simultaneous transmission and reception time, by the same control signal, said antenna switch performs an operation to electrically connect said antenna terminal, said one side terminal and said other side terminal of said antenna terminal and an operation to turn ON a switch of the switching notch filter of said composite filter.

17. The antenna duplexer according to claim 9, wherein, at said non-simultaneous transmission and reception time, by the same control signal, said antenna switch performs by time division an operation to handle individually the electrical connection with said one side terminal or said other side terminal from said antenna terminal and an operation to turn OFF a switch of said switching notch filter of said composite filter.

18. The antenna duplexer according to claim 9, wherein, when said switch is turned ON, said series resonance circuit attains a characteristic having the attenuation pole and, when said switch is turned OFF, said series resonance circuit is electrically separated in a channel from said input terminal to said output terminal, and the passing characteristic from said input terminal to said output terminal attains a substantially same characteristic as the transmitting circuit.

19. The antenna duplexer according to claim 9, wherein a FET is used for said switch.

20. The antenna duplexer according to claim 9, wherein a pin diode is used for said switch.

21. The antenna duplexer according to claim 9, wherein a pin diode and a quarter wave length line are used for said switch.

22. The antenna duplexer according to claim 9, wherein said series resonance circuit has a constitution in which a capacitor and a resonator are connected in series.

23. The antenna duplexer according to claim 9, wherein said series resonance circuit has a constitution in which an inductor and the resonator are connected in series.

24. The antenna duplexer according to claim 9, wherein said series resonance circuit has a constitution in which a circuit consisting of a capacitor and inductor connected in parallel and the resonator connected are connected in series.

25. The antenna duplexer according to any of claim 1 or 3, wherein said composite filter has an input terminal, an output terminal, at least one transmitting circuit and at least not less than one switching notch filter,
said transmitting circuit is electrically connected between said input terminal and said output terminal,
said switching notch filter is connected to at least either one of the input side and output side of said transmitting circuit,
said switching notch filter has at least one switch and at least one surface acoustic wave filter,
one end of said switch is connected between said input terminal and said output terminal,
the other end of said switch is connected to one end of said surface acoustic wave filter, and
said switch has a control terminal to switch ON/OFF.

26. The antenna duplexer according to claim 9, wherein said composite filter has an input terminal, an output terminal, and more than at least one switching notch filter connected to said input terminal and said output terminal,
said switching notch filter has two switches connected said input terminal and said output terminal, respectively,
the notch filter and the transmitting circuit have a predetermined characteristic are connected in parallel between said two switches, and
said notch filter and said transmitting circuit have a predetermined characteristic being able to be switched by said switch.

27. The antenna duplexer according to claim 26, wherein said notch filter consists of a parallel resonant circuit.

28. The antenna duplexer according to claim 26, wherein said notch filter is an surface acoustic wave filter.

29. A mobile communication device corresponding to simultaneous transmission and reception which simultaneously performs transmission and reception and non simultaneous transmission and reception which does not simultaneously perform transmission and reception comprising:
an antenna connection circuit; and
wherein the antenna duplexer according to claim 1 is used for said antenna connection circuit.

30. The mobile communication device corresponding to simultaneous transmission and reception which simultaneously performs transmission and reception and non-simultaneous transmission and reception which does not simultaneously perform transmission and reception,
wherein, at said non-simultaneous transmission and reception time, the antenna connection circuit is provided which operates as a transmit-receive selector switch having filters at a transmitting side and a receiving side and, at the simultaneous transmission and reception time, operates as the sharing unit, and
wherein the antenna duplexer according to claim 2 is used for said antenna connection circuit.

* * * * *